United States Patent [19]
Kuroda

[11] 3,908,370
[45] Sept. 30, 1975

[54] SYSTEM FOR CLEANING EXHAUST GASES FROM AN INTERNAL COMBUSTION ENGINE

[75] Inventor: Osamu Kuroda, Toyota, Japan

[73] Assignee: Toyota Jidosha Kogyo Kabushiki Kaisha, Japan

[22] Filed: July 25, 1974

[21] Appl. No.: 491,632

[30] Foreign Application Priority Data
May 22, 1974 Japan................................ 49-57411

[52] U.S. Cl.................................. 60/290; 137/599
[51] Int. Cl.² ........................................... F01N 3/10
[58] Field of Search.............................. 60/290, 289

[56] References Cited
UNITED STATES PATENTS
3,611,715  10/1971  Tatsutomi............................ 60/290
3,812,673  5/1974  Muroki................................ 60/290

Primary Examiner—Douglas Hart
Attorney, Agent, or Firm—Kenyon & Kenyon

[57] ABSTRACT

System for cleaning exhaust gases from an internal combustion engine, having a valve device for introducing the flow of air into the exhaust manifold to burn the unburnt components in the exhaust gases or for releasing said flow of air into the atmosphere by the action of negative pressure within the intake manifold. Said valve includes a casing defined therein first and second chambers separated by a valve seat having a first valve port at the center thereof, a third chamber defined in one part of said casing, a passageway defined in another part of said casing and communicating with said first chamber, a first valve plate connected to a diaphragm by a rod, said diaphragm arranged in said third chamber, and a second valve plate for controlling the pressure in said system, said second valve plate resiliently being urged toward second valve ports defined in said valve seat at the outer periphery thereof, wherein said valve device comprises a stop means for said second valve plate, secured to the inner wall surface of said casing.

4 Claims, 6 Drawing Figures

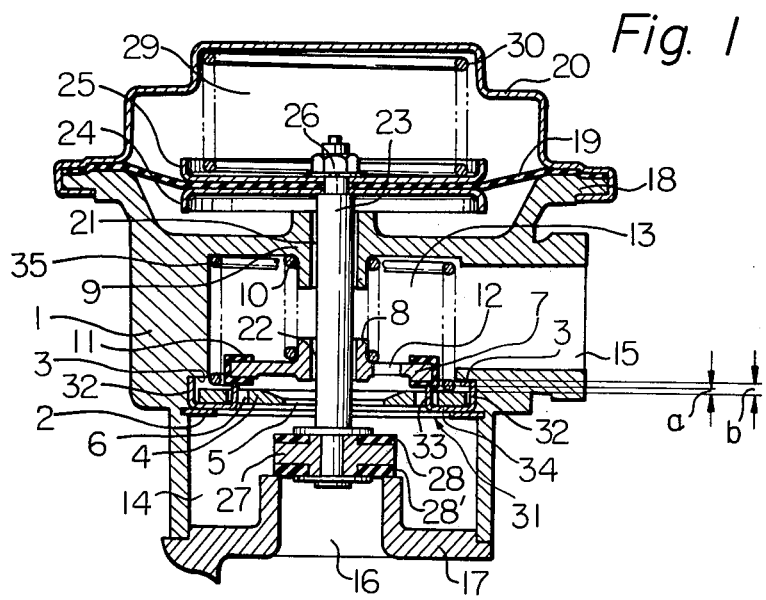
Fig. 1
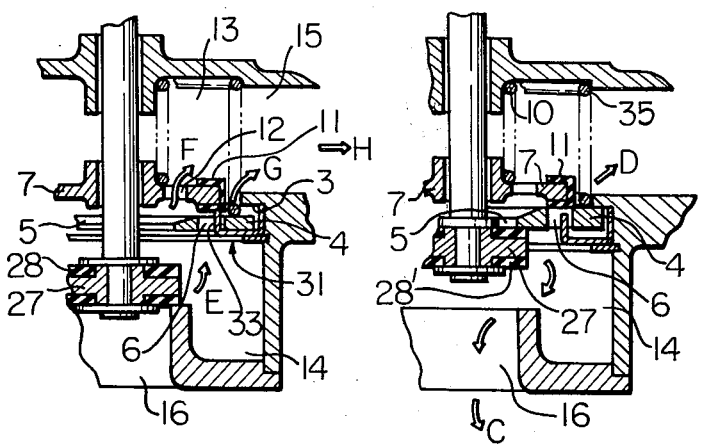
Fig. 4-b    Fig. 4-a

Fig. 2-a
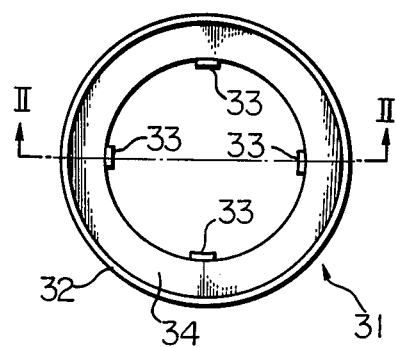
Fig. 2-b
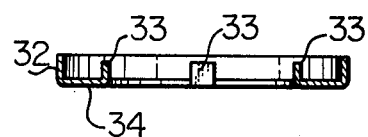

SYSTEM FOR CLEANING EXHAUST GASES FROM AN INTERNAL COMBUSTION ENGINE

BACKGROUND OF THE INVENTION

The present invention relates to a system for cleaning exhaust gases from an internal combustion engine, having a valve device for introducing the flow of air into the exhaust manifold in order to burn the unburnt components in the exhaust gases or for releasing said flow of air into the atmosphere, by the action of negative pressure within the intake manifold.

Such a valve device operates to introduce the flow of air (the pressure of which is controlled by a valve plate provided therein for regulating the pressure so as not to exceed a predetermined value) into the exhaust manifold in order to burn the unburnt components (such as HC or CO) and clean the exhaust gases from the cylinders when the engine is operating normally, in other words, when the amount of unburnt components is relatively small. It operates to release said flow of air into the atmosphere when the engine is operating abnormally, that is, when the amount of unburnt components is large. In this latter case, if the flow of air is introduced into the exhaust manifold, the unburnt components explode in the exhaust manifold, which is called "after burn". This causes the destruction of the engine. Said large amount of unburnt components is effected either when the engine runs on a long upward sloping or downward sloping road or when the fuel supplied to the cylinder of the engine is not ignited. Such a valve adapted for a system for cleaning the exhaust gases has been known, including: a casing defined therein, first and second chambers separated by a valve seat having a first valve port at the center thereof, and having second valve ports at the outer periphery thereof. The first chamber communicates with an air supply driven by the engine. The second chamber communicates with the atmosphere. A third chamber is defined in one part of said casing and communicates with the intake manifold of the engine. A passageway is defined in another part of the casing. The passageway provides communication between the first chamber and the exhaust manifold. A first valve plate is connected to a diaphragm by a rod, the diaphragm being arranged in the third chamber. In its first position the first valve plate closes the first valve port and releases the passageway so that the air from the air supply is introduced into the exhaust manifold in order to burn said unburnt components within the exhaust manifold, whereas in its second position said first valve plate releases the first valve port and closes the passageway so that the air from the air supply is released into the atmosphere. A second valve plate is adapted for controlling the pressure in the system so as not to exceed a predetermined value, and the second valve plate always resiliently closes the second valve ports.

A disadvantage of such a system for cleaning exhaust gases is it is very noisy when releasing the flow of air into the atmosphere. This is because the area of passage for the flow of air, formed by the first valve port is too small in comparison with the amount of air flowing, and also, because pulsation of pressure in the flow of air causes the second valve plate to beat upon the surface of the second valve ports thus creating noise.

SUMMARY OF THE INVENTION

One object of the present invention is to provide a system for cleaning exhaust gases from an internal combustion engine which will eliminate the above-mentioned disadvantage.

Another object of the invention is to provide a valve device adapted for the system for cleaning exhaust gases in an internal combustion engine.

A further object of the invention is to provide a valve which is simple in design.

These objects have been accomplished by the present invention. According to the invention there is provided a system for cleaning exhaust gases from an internal combustion engine, having a valve device for introducing the flow of air into the exhaust manifold to burn the unburnt components in the exhaust gases or for releasing said flow of air to the atmosphere, by the action of negative pressure within the intake manifold, said valve device including:

a casing defined therein first and second chambers separated by a valve seat having a first valve port at the center thereof, and having second valve ports at the outer periphery thereof, said first chamber communicating with an air supply driven by said engine, said second chamber, communicating with the atmosphere, a third chamber located in another part of said casing, said third chamber communicating with said intake manifold, a passageway defined in another part of said casing, said passageway providing communication between said first chamber and the exhaust manifold, a first valve plate connected, by a rod, to a diaphragm arranged in said third chamber, in its first position said first valve plate closes said first valve port and releases said passageway so that the air from said air supply is introduced into said exhaust manifold in order to burn said unburnt components within the exhaust manifold, whereas in its second position said first valve plate releases said outlet opening and closes said passageway so that the air from said air supply is released into the atmosphere, and a second valve plate for controlling the pressure in said system, said second valve plate being resiliently urged toward said second valve ports, wherein said valve comprises:

a stop means secured to the inner wall surface of the casing, said means holding said second valve plate at a distance apart from said second valve ports when said first valve plate is in its second position.

DESCRIPTION OF THE DRAWINGS

FIG. 1 is a sectional view of a valve device adapted for a system for cleaning exhaust gases from an internal combustion engine, according to the invention;

FIG. 2-*a* is a plan view of an annular stop member adapted for the valve device;

FIG. 2-*b* is a section taken on II—II line of FIG. 2-*a*;

FIG. 4-*a* is a fragmentary view of FIG. 1, in which the valve device is in its first position;

FIG. 4-*b* is a fragmentary view of FIG. 1, in which the valve device is in its second position.

DETAILED DESCRIPTION OF THE INVENTION

Figure 3:
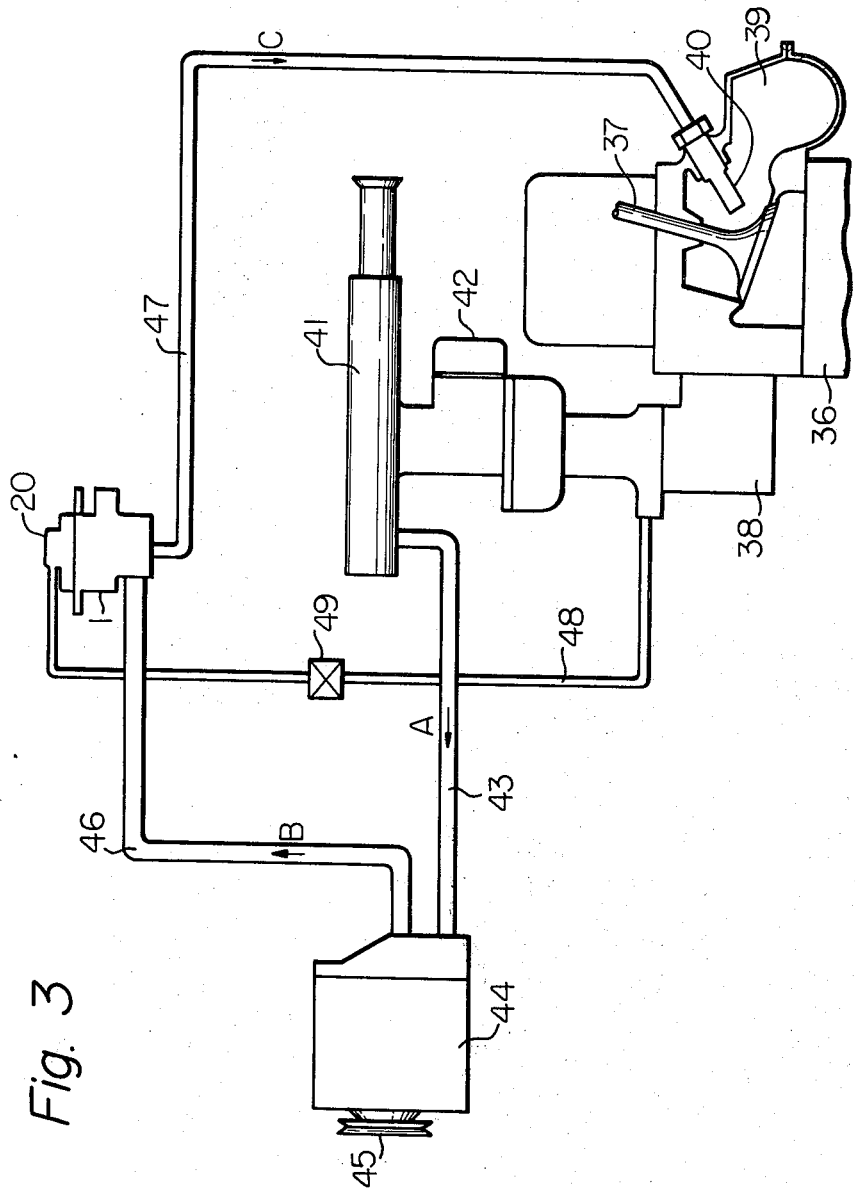
FIG. 3 is a diagram showing the system for cleaning exhaust gases, according to the present invention.

Referring to FIG. 1, a valve casing is designated by reference number 1. The inner cylindrical wall of the valve casing 1 has an annular groove to which a snap ring 2 is fitted, and an annular shoulder 3. A valve seat 4 is arranged between the snap ring 2 and the annular shoulder 3. The valve seat 4 has a valve port 5 at the center thereof and a plurality of valve ports 6 for diverting air in the casing 1 into the atmosphere, the valve ports 6 being arranged on a periphery of the valve seat 4 around the valve port 5. A valve plate 7 for regulating the pressure is arranged coaxially with the valve seat 4. A sealing member 11 mounted around the periphery of the valve plate 7 is urged toward the valve seat 4 by means of a spring 10 which is arranged between the upper surface of the valve plate 7 and upper inner wall of the valve casing 1. The valve plate 7 has an outlet opening 12. The inner space of the valve casing 1 defined by the inner wall of the valve casing 1 is divided into two chambers 13 and 14 by the valve seat 4 and the valve plate 7, the chamber 13 communicating with the atmosphere and the chamber 14 communicating with an air supply (pump).

The valve plate 17 is secured to the lower portion of the valve casing 1. The valve casing 1 has a cover 20 which secures a diaphragm 19 at the periphery thereof to a flange portion 18 of the valve casing 1.

A rod 23 is arranged through an opening 21 defined in a boss portion 9 of the valve casing 1, an opening 22 defined in a boss portion 8 of the valve plate 7, and the valve port 5. One end of the rod 23 is secured to the diaphragm by a pair of plates 24 and 25 and nut 26, while other end of the rod 23 is secured to a valve plate 27. Sealing members 28 28' are attached to the upper and lower surface of the valve plate 27. A chamber 29 which communicates with the intake manifold of the engine is defined by the lower surface of the cover 30 and the upper surface of the diaphragm 19, in the upper portion of the valve casing 1. A coil spring 30 is arranged between the inner surface of the cover 20 and the upper surface of the plate 25.

The spring 30 urges the plate 25 in such a manner that the valve plate 27 closes the valve port 16 when the chamber is not in communication with the intake manifold of the engine.

The above-mentioned construction is substantially the same as known valve devices.

The improved construction of the valve device, according to the present invention, is described hereinafter.

An annular stop member 31 is arranged between the annular shoulder 3 and the snap ring 2. The valve seat 4 is urged toward the stop member 31 by a coil spring 35 which is arranged between the upper wall of the chamber 13 and the valve seat 4.

As can be seen from FIGS. 2-a and 2-b, the stop member 31 comprises an outer cylindrical wall portion 32, four inner projections 33, and an annular portion 34 connecting the outer wall portion 32 and the projections 33. These four projections 33 are arranged at right angles to each other, on the inner periphery of annular portion 34.

As is shown in FIG. 1, side wall portion 32 is fixed between the annular shoulder 3 and the snap ring 2. The valve seat 4 rests on the annular portion 34. The projections 33 are inserted through the respective valve ports 6 of the valve seat 4.

The valve seat 4 is urged downwardly to the upper surface of the annular portion 34 of the stop member 31 by the action of the coil spring 35. It should be noted that the height of the outer wall portion 32 of the stopper 31 is such that the stopper 31 is rigidly fixed between the annular shoulder 3 and the snap ring 2, the height of the side wall 32 is higher than that of the projections 33, and the height of the projections 33 is higher than that of the height of the valve seat 4. In other words, in the position shown in FIG. 1, the sealing member 11 of the valve plate 7 is held at a distance (a) from the valve ports 6 by the projections 33 protruding from the respective valve ports 6, and a distance (b) between the annular shoulder 3 and the upper surface of the valve seat 4 is larger than said distance (a).

Referring to FIG. 3, there is shown a systematic diagram of a system for cleaning exhaust gases according to the present invention, having the above-mentioned valve device. Said system comprises cylinders 36, exhaust valves 37, an intake manifold 38, an exhaust manifold 39, a nozzle 40 for introducing the flow of air to burn the unburnt components in the exhaust gases from the cylinder 36, an air cleaner 41, a carbureter 42, a pipe line 43 communicating with the air cleaner 41, an air pump 44 communicating with the pipe line 43, said pump 44 driven by a pulley 45 connected to the crank shaft of the engine (not shown), a pipe line 46 communicating the air pump 44 with the chamber 14 (FIG. 1) of the valve device, a pipe line 47 communicating the valve port 16 (FIG. 1) of the valve device with the nozzle 40, and a pipe line 48 communicating the intake manifold 38 with the chamber 29 of the valve device through a valve 49.

The system for cleaning exhaust gases from the engine, according to the present invention, operates as follows.

When an engine is operating at a normal condition, in other words, when the amount of unburnt components from the engine is small enough not to cause the "after burn", it is necessary to control the valve 49 to be opened so as to communicate the intake manifold 38 under the negative pressure by the rotation of the crank shaft with the chamber 29 of the valve device, so that negative pressure in the intake manifold 38 prevails in the chamber 29, and therefore, diaphragm 19 and the valve plate 27 displaces upwardly by the action of the negative pressure against the spring 30. As a result of this, the valve seat 4 and the valve plate 7 displace upwardly against the springs 35 and 10, respectively, and they take the position shown in FIG. 4-a. In this position the valve port 5 of the valve seat 4 is closed by the upper sealing member 28 of the valve plate 27, whereas the valve port 16 which communicates with the nozzle 40 (FIG. 31) through the pipe line 47, is opened. When this happens, a flow of air from the air cleaner 41 (FIG. 3) is introduced through the pipe line 43 to the pipe line 16 as shown by arrow A, by the rotation of the air pump 44, and the air from the pipe line 46 is introduced into the chamber 14 of the valve device as shown by arrow B. The air thus introduced into the chamber 14 passes through the valve port 16 and is introduced to the nozzle 40 through the pipe line 47 as shown by arrow C. Thus the flow of air is introduced from the nozzle 40 into the exhaust manifold 39. As a result of this, unburnt components in the exhaust gases from the cylinders 36 are burned by the flow of air from the nozzle 40. The exhaust gases thus cleaned are exhausted through the tail pipe via the muffler. When the pressure of the air in the chamber 14 increases the valve plate 7 moves upwardly against the spring 10. Therefore, a part of the flow of air is diverted from the chamber 14 to the atmosphere through the space between the lower surface of sealing member 11 and the upper surface of the valve port 6, as shown by arrow D. As a result of this, the pressure in the system does not exceed a predetermined value.

When the engine operates at such a condition so that the amount of unburnt components in the exhaust gases are large enough to cause "after burn", it is necessary to control the valve 49 to be closed. As a result of this the negative pressure in the intake manifold 38 does not prevail in the chamber 29 of the valve device. Therefore, the negative pressure in the diaphragm chamber 29 is eliminated. When the diaphragm and the valve plate 27 move downwardly by action of the spring 30, valve plate 7 and the valve seat 4 also move downwardly by action of the spring 10 and 35, respectively. And they take the position shown in FIG. 4-b. In this position, the valve port 16 is closed by the sealing member 28' of the valve plate 27, whereas the valve port 5 of the valve seat 4 is opened. It should be noted that in this arrangement the lower surface of the sealing member 11 of the pressure regulating valve 7 is held apart from the upper surface of the valve port 6 at a distance (a) by the top ends of the projections 33 of the stop member 31, the top ends supporting the valve plate 7 at the lower surface thereof. In this case, the flow of air from the air cleaner 41 is introduced through the pipe line 43 (FIG. 3) as shown by arrow A to the pipe line 46, by the rotation of the air pump 44, and the flow of air from the pipe line 46 is introduced into the chamber 14 of the valve device, as shown by arrow B. The air thus introduced into the chamber 14 (FIG. 4-b) is also introduced into the chamber 13 not only through a first passage formed by valve port 5 and outlet opening 12 as shown by arrow F, but also through a second passage formed by the space between the lower surface of sealing member 11 and the upper surface of the valve ports 6 as shown by arrow G. The air thus introduced into the chamber 13 is released into the atmosphere as shown by arrow H.

The above description of the operation of the system according to the invention will enable their specific advantages to be appreciated. It should be understood that in the prior arts the flow of air is released into the atmosphere only through a passage which corresponds to the first passage mentioned above, while in the present invention the flow of air is released into the atmosphere not only through the first passage but also through the second passage. Therefore, the area of the passage for releasing the flow of air into the atmosphere increases in comparison with the prior arts, so that noise, which is effected when the flow of air passes through said passage, decreases.

It should also be understood that, in the prior arts, a valve plate (which is substantially the same as the valve plate 7 of the present invention) always closes the valve ports (which are substantially the same as the valve port 6) by action of a spring (which is substantially the same as the spring 10), therefore pulsation of pressure in the flow of air causes the valve plate to beat the surface of the valve ports so as to create noise. While in the present invention the valve plate 7 is held apart from the valve seat 4 by the stop member 31 when the valve device takes the position shown in FIG. 4-b. Therefore, pulsation of pressure in the flow of the air does not cause the valve plate 7 to beat upon the surface of the valve ports 6 of the valve seat 4 so that with the result that said noise is not created. The above-mentioned advantage makes it possible to decrease the total amount of noise in the system, for cleaning exhaust gases from the engine according to the present invention.

What is claimed is:

1. System for cleaning exhaust gases from an internal combustion engine, having a valve device for introducing the flow of air into the exhaust manifold in order to burn the unburnt components in said exhaust gases or for releasing said flow of air into the atmosphere by action of negative pressure within the intake manifold, said valve device including:
   a casing defining therein first and second chambers separated by a valve seat having a first valve port at the center thereof, and having second valve ports at the outer periphery thereof, said first chamber being in communication with an air supply operated by said engine, said second chamber being in communication with the atmosphere,
   a third chamber defined in one part of said casing, said third chamber being in communication with said intake manifold,
   a passageway defined in another part of said casing, said passageway communicating said first chamber with the exhaust manifold,
   a first valve plate connected to a diaphragm arranged in said third chamber by a rod; in its first position said first valve plate closing said first valve port and releasing said passageway so that the air from said air supply is introduced into said exhaust manifold to burn said unburnt components within the exhaust manifold, whereas in its second position said first valve plate releases said first valve port and closes said passageway so that the air from said air supply is released into the atmosphere, and
   a second valve plate for controlling the pressure in said system, said second valve plate being resiliently urged toward said second valve ports, wherein said valve device comprises:
   a stop means secured to the inner wall of the casing, said means holding said second valve at a distance from said second valve ports when said first valve is in its second position.

2. System for cleaning exhaust gases according to claim 1, wherein said stop means comprises:
   a snap ring secured to an annular groove defined in said inner wall surface of said casing; an annular shoulder formed on said inner wall; a stop member having a cylindrical side wall portion adapted for fixing said stop member between said shoulder and said snap ring, a plurality of projections inserted through said respective second valve ports and an annular portion connecting said side wall portion with said projections, the height of said projections being higher than that of said valve seat, and the height of said cylindrical wall portion being higher than that of said projections; and a resilient member for urging said valve seat toward said annular portion.

3. System for cleaning exhaust gases according to claim 2, wherein said resilient member is a coil spring arranged between the wall portion of said second chamber and said valve seat.

4. System for cleaning exhaust gases according to claim 2, wherein four projections are arranged at right angles to each other along the inner periphery of said annular portion.

* * * * *